United States Patent
Akerstrom et al.

(10) Patent No.: US 10,213,714 B2
(45) Date of Patent: Feb. 26, 2019

(54) FILTER HEATER ARRANGEMENT

(71) Applicant: GE HEALTHCARE BIO-SCIENCES AB, Uppsala (SE)

(72) Inventors: Patrik Berndt Akerstrom, Uppsala (SE); Lars Johan Carlsson, Kungsangen (SE); Patric Fricking, Uppsala (SE); Patrick Jonsson, Uppsala (SE); Peter Reffner, Uppsala (SE); Henrik K. Eriksson, Alunda (SE)

(73) Assignee: GE HEALTHCARE BIO-SCIENCES AB, Uppsala (SE)

( * ) Notice: Subject to any disclaimer, the term of this patent is extended or adjusted under 35 U.S.C. 154(b) by 239 days.

(21) Appl. No.: 14/899,713

(22) PCT Filed: Jun. 17, 2014

(86) PCT No.: PCT/SE2014/050733
§ 371 (c)(1),
(2) Date: Dec. 18, 2015

(87) PCT Pub. No.: WO2014/204389
PCT Pub. Date: Dec. 24, 2014

(65) Prior Publication Data
US 2016/0136549 A1 May 19, 2016

(30) Foreign Application Priority Data
Jun. 19, 2013 (SE) ....................... 1350747

(51) Int. Cl.
*B01D 35/18* (2006.01)
*B01D 35/30* (2006.01)

(52) U.S. Cl.
CPC .............. *B01D 35/18* (2013.01); *B01D 35/30* (2013.01); *B01D 2201/4084* (2013.01)

(58) Field of Classification Search
CPC ..................................................... B01D 35/18
See application file for complete search history.

(56) References Cited

U.S. PATENT DOCUMENTS

2006/0021203 A1* 2/2006 Nails ......................... A44B 9/18
24/499
2007/0151547 A1 7/2007 Poje
(Continued)

FOREIGN PATENT DOCUMENTS

| CN | 201346416 Y | 11/2009 |
| CN | 201543306 U | 8/2010 |
| DE | 4407750 A1 | 9/1994 |

(Continued)

OTHER PUBLICATIONS

Extended European Search Report Received for European Patent Application No. 14813333.3, dated Feb. 17, 2017, 7 pages.
(Continued)

*Primary Examiner* — Peter Keyworth
(74) *Attorney, Agent, or Firm* — Wood IP LLC

(57) ABSTRACT

A filter heater arranged to enclose a filter, wherein said filter heater comprises two similar halves each having a protruding handle on one side, whereby the handles are kept together by a spring mechanism such that pinching the handles towards each other will force the sides of the two halves opposite the handles from each other.

7 Claims, 2 Drawing Sheets

(56) References Cited

U.S. PATENT DOCUMENTS

2008/0179239 A1  7/2008  Huelskamp
2010/0294464 A1  11/2010  Graber et al.

FOREIGN PATENT DOCUMENTS

EP      3010622 A1    4/2016
GB      1216769 A     12/1970
WO      2014/204389 A1  12/2014

OTHER PUBLICATIONS

International Search Report and Written Opinion Received for PCT Application No. PCT/SE2014/050733, dated Dec. 12, 2014, 8 pages.
International Preliminary Report on Patentability Received for PCT Application No. PCT/SE2014/050733, dated Dec. 12, 2015, 5 pages.
Office Action for Chinese Patent Appl. No. 201480035221.0, filed Jun. 17, 2014, 5 pages, dated Sep. 12, 2016.

\* cited by examiner

FILTER HEATER ARRANGEMENT

TECHNICAL FIELD OF INVENTION

Embodiments of the present invention relates to a filter heater arrangement and to a filter heater.

BACKGROUND OF THE INVENTION

Filters used in for example bioreactors or fermentors need to be heated in order to remove condensed liquid to prevent them from clogging. In order to heat the filter it is suitable to enclose the filter by a filter heater. The filters may have inlet connection and outlet connections. The filter heater should be able to attach to the filter without disconnecting connecting tubes or other connections to the filter. Prior art filter heaters have been difficult to attach to the filter and furthermore the combination of filter, filter heater and tubes has been a bit bulky and not easily handled.

SUMMARY OF THE INVENTION

An object of the invention is to provide an easily handled filter heater and a robust and easily handled stand for the filter and filter heater.

This is achieved in a filter heater arranged to enclose a filter, wherein the filter heater comprises two similar halves each having a protruding handle on one side, whereby the handles are kept together by a spring mechanism such that pinching the handles towards each other will force the sides of the two halves opposite the handles from each other and in a filter heater arrangement wherein the stand comprises at least three legs and a filter holding part elevated by the legs from a surface where the stand is provided, wherein the filter holding part of the stand is arranged to receive protruding parts of the two similar halves of the filter heater such that the halves are kept together in the stand. Hereby the filter heater can be attached to the filter by only using one hand and the filter and the filter heater can be held together steadily in an upright position. The stand is keeping the filter heater parts together around the filter.

DETAILED DESCRIPTION

Figure 1:
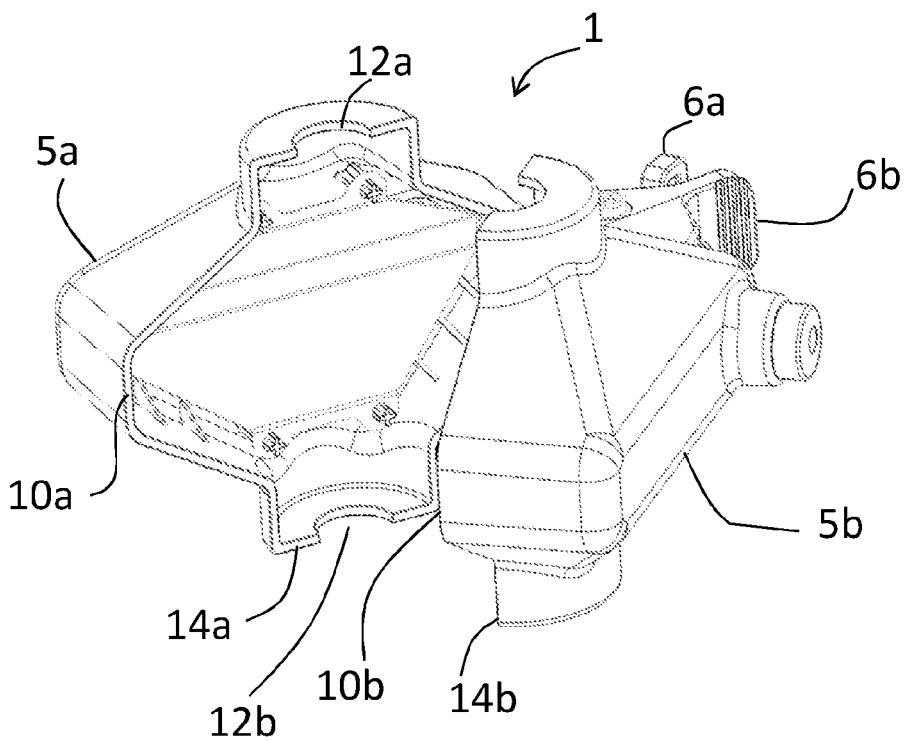
FIG. 1 shows a filter heater according to an embodiment of the invention.

FIG. 1 shows a filter heater 1 according to an embodiment of the invention. The filter heater 1 is arranged to enclose a filter 3 (shown in FIG. 3) which can be connected to for example tubes or other devices in one or both ends. The filter heater 1 comprises two similar halves 5a, 5b each having a protruding handle 6a, 6b on one side. The halves 5a, 5b could even be identical and that would be suitable for construction reasons. The handles are kept together by a spring mechanism such that pinching the handles towards each other will force the sides 10a, 10b of the two halves opposite the handles away from each other. When releasing the handles 6a, 6b the two halves 5a, 5b will be closing around the filter 3. When the two halves 5a, 5b of the filter heater 1 are closed a first opening 12a for receiving a filter outlet or a connecting tube to a filter outlet is provided and a second opening 12b for receiving a filter inlet or a connecting tube to a filter inlet is provided. Each half 5a, 5b comprises around at least one of the first or second openings 12a, 12b a protruding part 14a, 14b adapted to be received in a stand to keep the two halves together around the filter 3 and to keep the filter in an upright position. An advantage with having the filter in an upright position instead of lying is that any condense on the lower side of the filter will return into for example a bioreactor to which the filter can be connected. The filter heater 1 heats the filter by electrical heaters. Resistive heaters are provided on the inside of each halves 5a, 5b.

Figure 2:
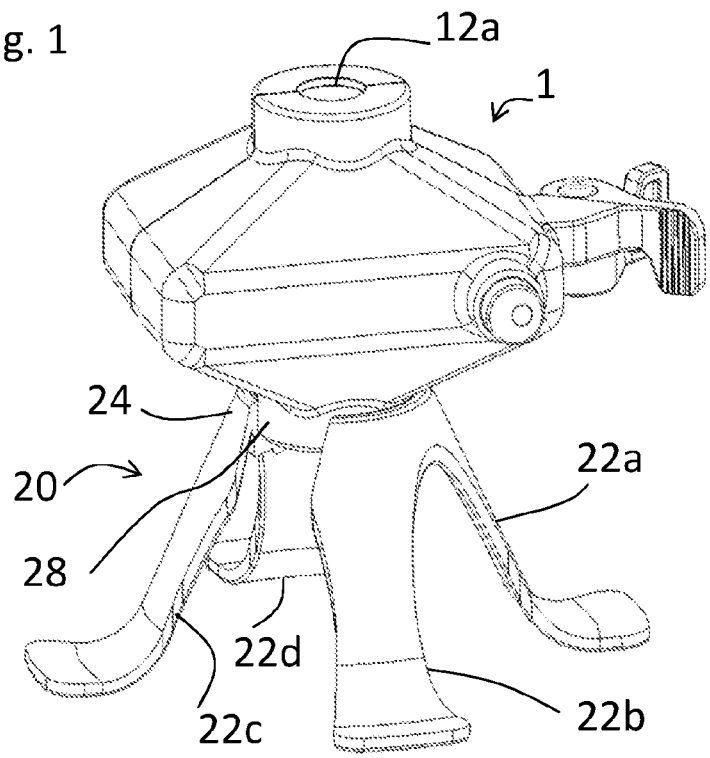
FIG. 2 shows a filter heater arrangement comprising a filter heater and a stand according to an embodiment of the invention.

FIG. 2 shows a filter heater arrangement comprising a filter heater 1 as described above and a stand 20 according to an embodiment of the invention. The stand comprises at least three but suitably four legs 22a, 22b, 22c, 22d. The stand comprises also a filter holding part 24 elevated by the legs 22a, 22b, 22c, 22d from a surface where the stand 20 is provided. The filter holding part 24 comprises an opening 28 for receiving a tube possibly attached to the filter inlet during insertion of the filter heater 1 and the enclosed filter 3 into the stand 20.

The filter holding part 24 of the stand 20 also receives the protruding parts 14a, 14b of the two similar halves 5a, 5b of the filter heater 1 such that the halves 5a, 5b are kept together in the stand 20.

Figure 3:
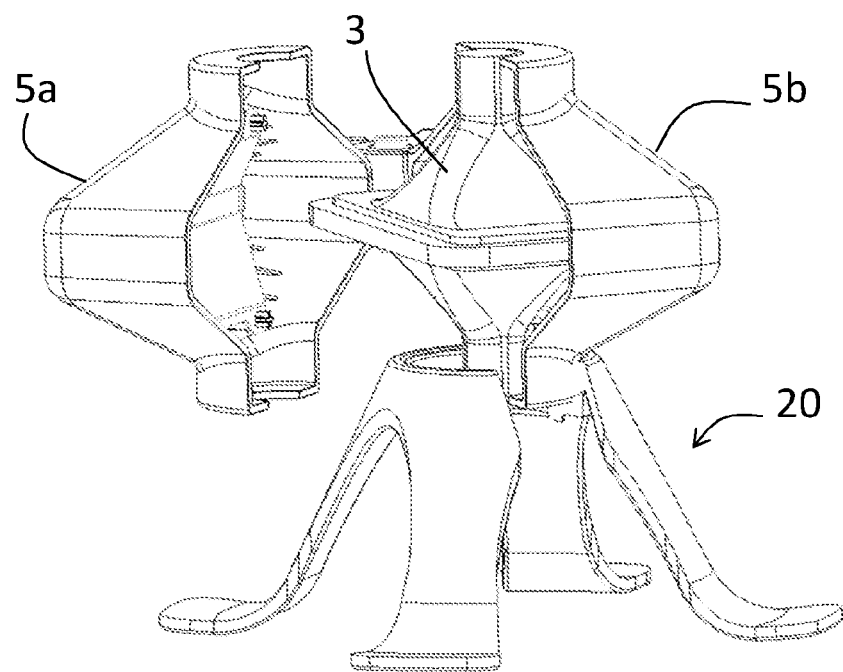
FIG. 3 shows a filter, a filter heater and stand according to an embodiment of the invention.

FIG. 3 shows a filter 3, a filter heater 1 and stand 20 according to an embodiment of the invention.

Figure 4:
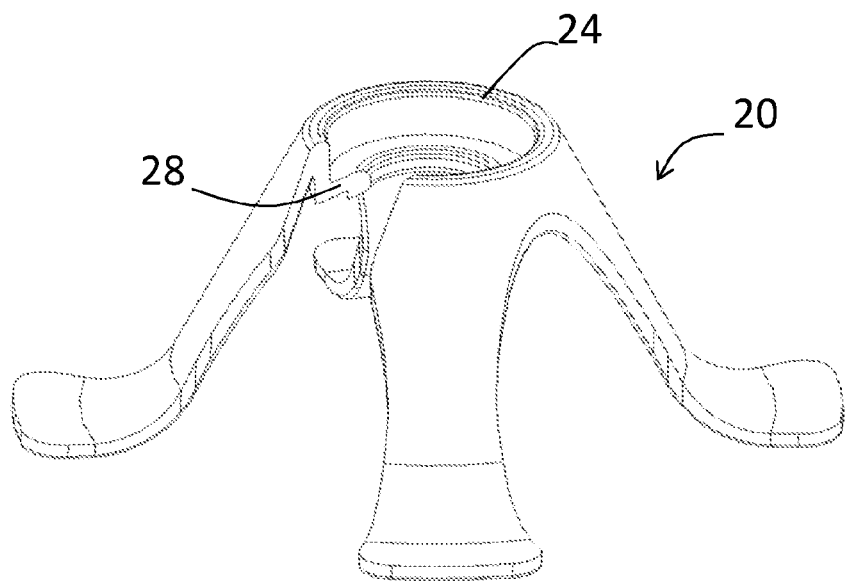
FIG. 4 shows the stand.

FIG. 4 shows the stand 20.

Embodiments of the present invention provide an easily handled filter heater that can be applied to the filter and removed from the filter by using only one hand. The filter heater can also be provided in an upright position in the stand and the two halves are kept together by the stand. Furthermore any connections to the filter can be convenient handled with this arrangement according to an embodiment of the invention. The connections are not affected at all when the filter heater is applied or removed from/to the filter and a tube connection can be inserted through the opening in the stand.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A filter heater arranged to enclose a filter, the filter heater comprising:
   two similar body part halves, each body part half comprising:
      a resistive heater disposed on an inside thereof and configured to heat the filter, and
      a protruding handle on one side thereof,
      wherein the protruding handles are kept together by a spring mechanism such that pinching the protruding handles towards each other will force the sides of the two body part halves opposite the protruding handles open away from each other, and wherein the filter is to be disposed therein between the two body part halves and when releasing the protruding handles, the two body part halves close together, thereby encompassing the filter therein.

2. A filter heater according to claim 1, further comprising protruding parts from each body part half adapted to be held together in a stand when the filter heater is closed around the filter.

3. A filter heater arrangement comprising a filter heater according to claim 1 and a stand, wherein said stand comprises at least three legs and a filter holding part elevated by the legs from a surface where the stand is provided, wherein the filter holding part of the stand is arranged to receive protruding parts of the two similar halves of the filter heater such that the halves are kept together in the stand.

4. A filter heater arrangement according to claim 3, wherein said filter holding part comprises an opening for receiving a tube attached to the filter.

5. A filter heater according to claim 2, comprising electrical heaters on the inside of the two similar body part halves adapted to heat the enclosed filter.

6. A filter heater arrangement comprising a filter heater according to claim 2 and a stand, wherein said stand comprises at least three legs and a filter holding part elevated by the legs from a surface where the stand is provided, wherein the filter holding part of the stand is arranged to receive protruding parts of the two similar body part halves of the filter heater such that the body part halves are kept together in the stand.

7. A filter heater arrangement according to claim 6, wherein said filter holding part comprises an opening for receiving a tube attached to the filter.

* * * * *